United States Patent [19]
Fincher

[11] 3,727,401
[45] Apr. 17, 1973

[54] ROTARY TURBINE ENGINE

[76] Inventor: Julian D. Fincher, P. O. Box 294, Pensacola, Fla. 32502

[22] Filed: Mar. 19, 1971

[21] Appl. No.: 125,931

[52] U.S. Cl. ............................60/39.35, 60/39.16 C
[51] Int. Cl. .................................................F02c 3/16
[58] Field of Search.........................60/39.35, 39.34, 60/39.16 C; 415/63

[56] References Cited

UNITED STATES PATENTS

| | | | |
|---|---|---|---|
| 3,077,075 | 2/1963 | Turanciol | 60/39.35 |
| 1,868,143 | 7/1932 | Heinze | 60/39.35 |
| 3,557,551 | 1/1971 | Campbell | 60/39.35 |
| 1,003,708 | 9/1911 | Coleman | 60/39.35 |

FOREIGN PATENTS OR APPLICATIONS

| | | | |
|---|---|---|---|
| 934,755 | 1/1948 | France | 60/39.35 |
| 820,337 | 9/1959 | Great Britain | 60/39.35 |
| 801,281 | 9/1958 | Great Britain | 60/39.35 |

*Primary Examiner*—Carlton R. Croyle
*Assistant Examiner*—Warren Olsen
*Attorney*—Clarence A. O'Brien and Harvey B. Jacobson

[57] ABSTRACT

Intake air undergoes two stage compression within a pair of co-axially mounted, counter-rotating rotors of a radial turbine engine and is tangentially discharged into a turbine mounted by one of the rotors. The air is heated and accelerated by discharge of combustion products from fuel burners mounted on the second stage compressor vanes in the other of the rotors to produce reaction thrust. Extensions of some of the second stage compressor vanes form discharge passages for the mixture of air and combustion products.

6 Claims, 6 Drawing Figures

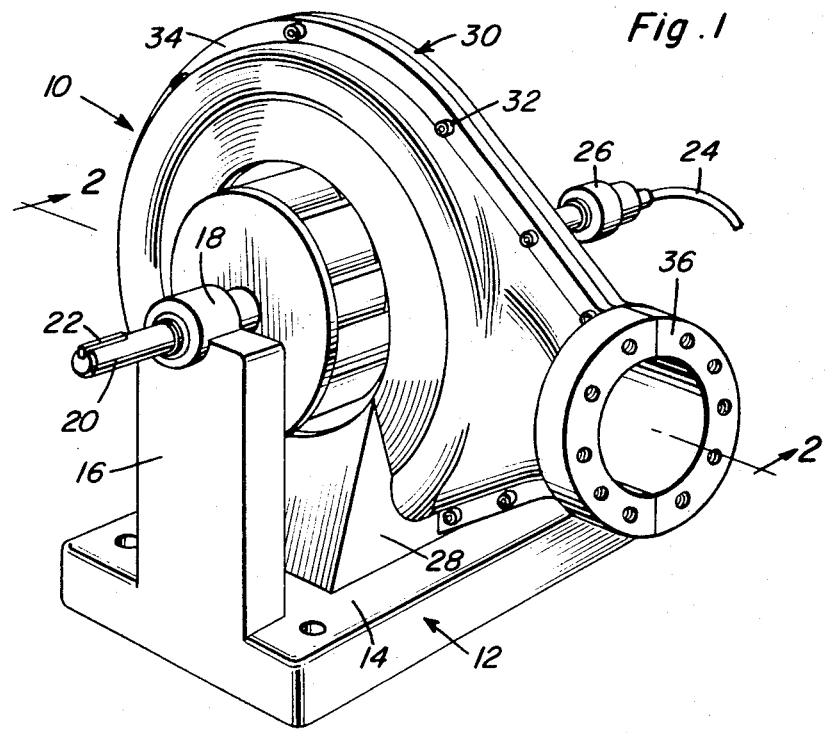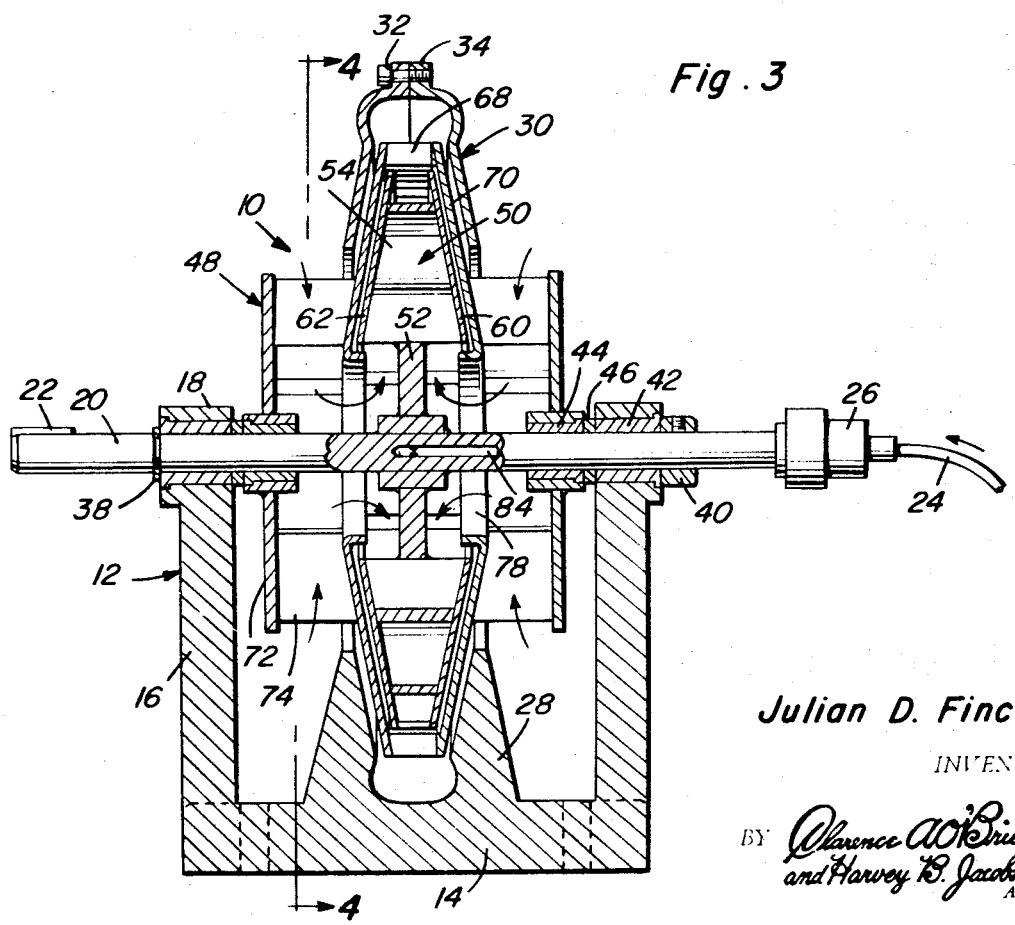

Julian D. Fincher
INVENTOR.

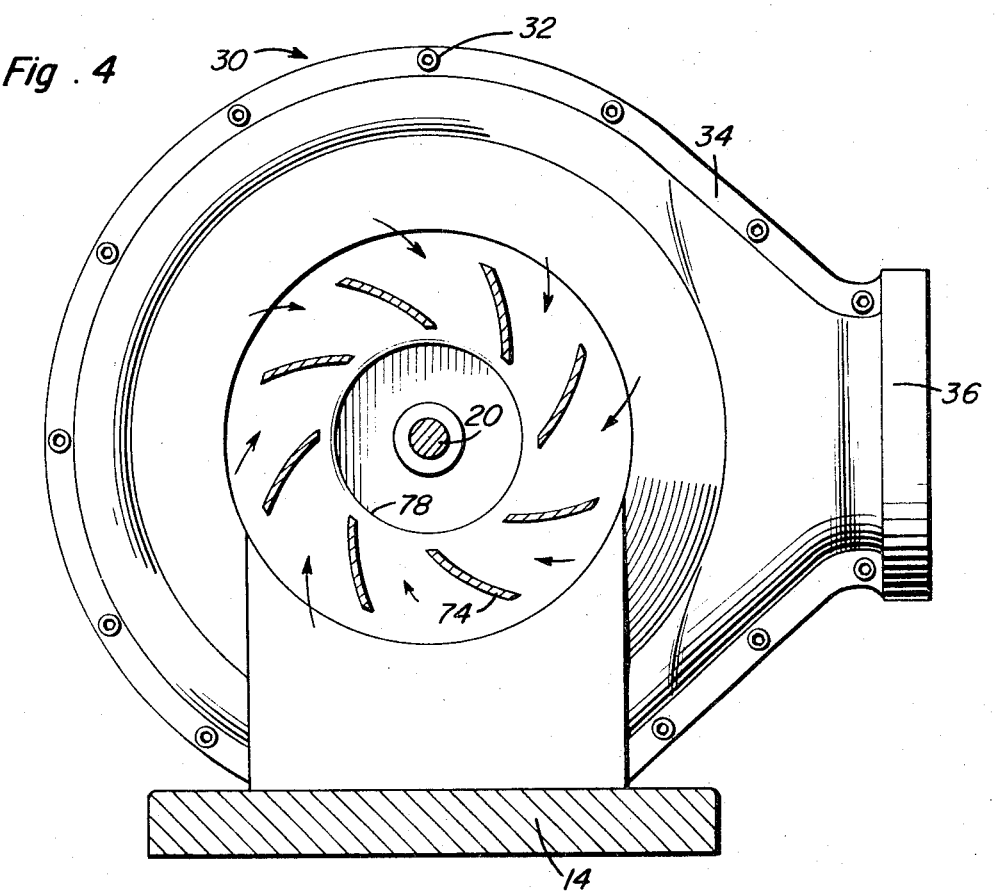
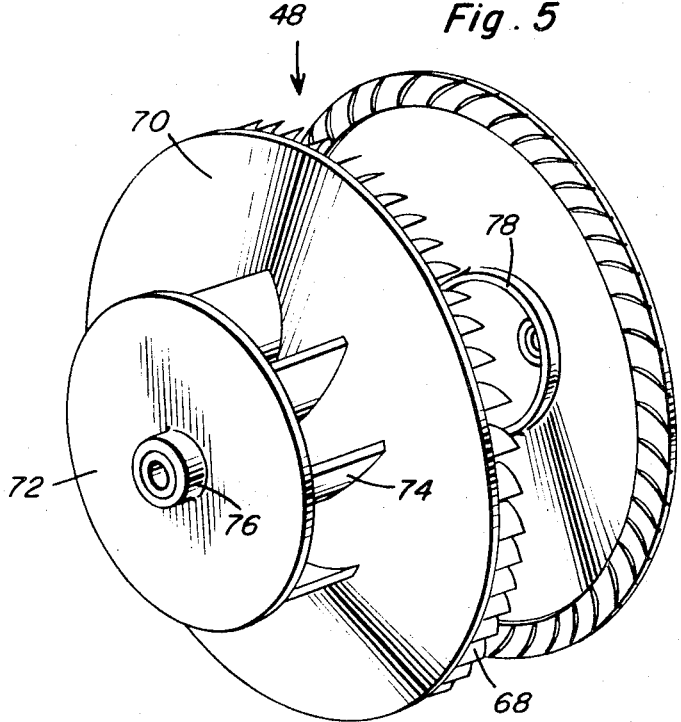

ROTARY TURBINE ENGINE

This invention relates to a radial turbine type of engine and more particularly to a unique structural arrangement for such an engine.

The present invention pertains to a compact gas turbine engine from which power is obtained in the form of a rotating power shaft. The engine features a pair of counter-rotating rotors one of which is fixed to the power shaft. Both rotors mount compressor vanes for two stage compression of air. The air is drawn in through the compressor blades of one of the rotors on which the turbine blades are also mounted radially outwardly of the compressor blades on the other of the rotors fixed to the power shaft. Thus, the air is sequentially compressed radially inwardly and then radially outwardly before being discharged into the turbine blades to impart rotation to the turbine rotor. Fuel burners on the power shaft rotor discharge jets of combustion products so as to impart thermal energy and kinetic energy to the air during compression as well as to produce reaction thrust imparting rotation to the power shaft mounted rotor. The mixture of air and combustion products exits from the turbine blades within an outer manifold housing from which the mixture is exhausted.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view showing a typical gas turbine engine constructed in accordance with the present invention.

FIG. 3 is a transverse sectional view taken substantially through a plane indicated by section line 3—3 in FIG. 2.

FIG. 4 is a side sectional view taken substantially through a plane indicated by section line 4—4 in FIG. 3.

FIG. 5 is a perspective view showing one of the rotor assemblies associated with the turbine engine.

Figure 2:
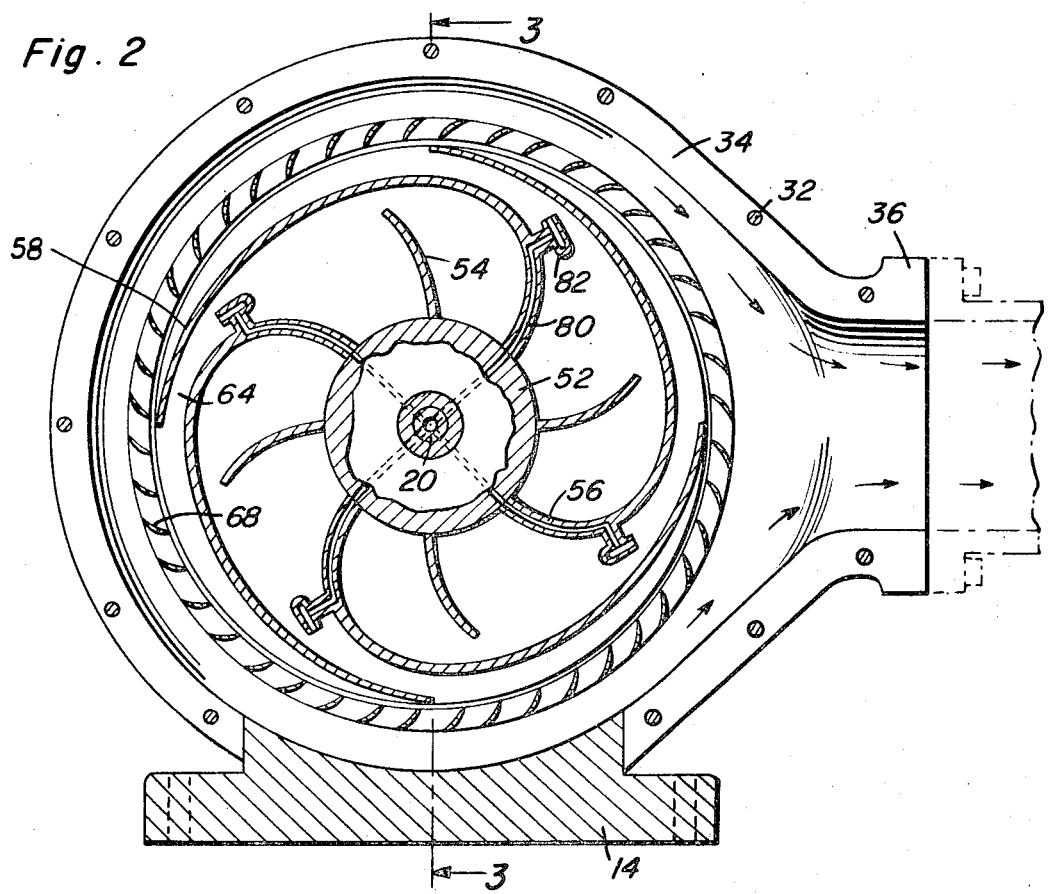
FIG. 2 is a side sectional view taken substantially through a plane indicated by section line 2-2 in FIG. 1.

Referring now to the drawings in detail, FIG. 1 illustrates one embodiment of a gas turbine engine constructed in accordance with the present invention and generally denoted by reference numeral 10. The engine is mounted by a suitable frame generally referred to by reference numeral 12 having a base portion 14 and a pair of standards 16 mounting bearing blocks 18 through which a power delivery shaft 20 extends adapted to be connected to some load at one end by means of a key 22. A suitable fuel is supplied to the engine through the other end of the power delivery shaft 20 by means of the fuel supply line 24 and the fitting 26. The frame also includes a base block portion 28 to which a manifold housing 30 is fixedly secured. The manifold housing may be formed by two sections interconnected by a plurality of fasteners 32 along abutting flange portions 34. The manifold housing may be of a generally annular shape converging at one circumferential location toward an exhaust opening surrounded by a circular flange 36 to which an exhaust conduit is adapted to be secured along an axis perpendicular to the rotational axis of the power delivery shaft 20.

As more clearly seen in FIG. 3, the power shaft is axially fixed between the bearing blocks 18 by means of the thrust washer 38 and the set screw mounted collar 40 axially abutting sleeve bearings 42 journaling the power shaft. Sleeve bearings 44 are also supported on the power shaft spaced from the bearings 42 by spacers 46 in order to rotatably support a free-running rotor assembly generally referred to by reference numeral 48 that is not mechanically loaded. A second rotor assembly 50 is axially and rotationally fixed to the power shaft 20 within the rotor assembly 48.

Figure 6:
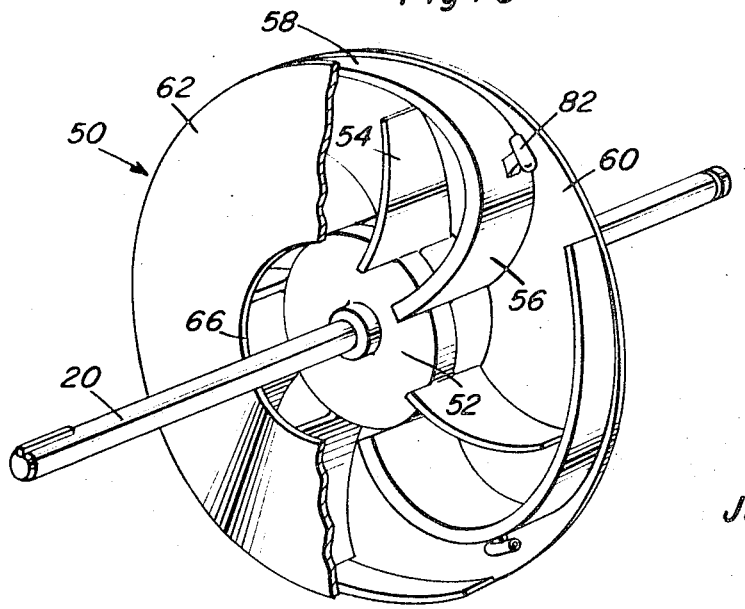
FIG. 6 is a perspective view showing the other rotor assembly associated with the gas turbine engine with a portion broken away.

Referring now to FIGS. 2, 3 and 6, the rotor assembly 50 includes a hub disc 52 secured to the power shaft 20. Secured to the hub disc 52 and projecting radially outwardly therefrom are a plurality of curved compressor vanes 54 that are relatively short in length as compared to alternatively spaced longer compressor vanes 56 provided with circumferentially overlapping extensions 58 terminating at the radially outer periphery of a pair of circular end wall discs 60 and 62 between which the compressor vanes 54 and 56 are disposed and to which they are connected as by welding. The compressor vanes furthermore converge radially outwardly so as to form volumetrically decreasing flow area therebetween and within the discharge passages 64 formed between the overlapping portions of the vanes 56 and extensions 58. The end wall discs 62 are provided with central inlet openings 66 into which an intake fluid such as air is admitted for flow radially outwardly during rotation of the rotor assembly 50. Accordingly, fluid will be discharged tangentially from the discharge passages 64 of the rotor assembly 50 after undergoing compression.

The fluid discharged from the rotor assembly 50, impinges upon circumferentially spaced turbine blades 68 fixed between the radially outer peripheral portions of a pair of intermediate discs 70 associated with the rotor assembly 48. With reference to FIGS. 2, 3, 4 and 6, the intermediate discs 70 of the rotor assembly 48 are interconnected with end wall discs 72 by first stage compressor vanes 74. The end wall discs 72 are provided with sleeve portions 76 supported on the sleeve bearings 44 aforementioned. Further, the end wall discs 72 are of a smaller diameter than the intermediate discs 70. The intermediate discs 70 are formed with central outlet openings 78 aligned with the inlet openings 66 in the rotor assembly 50 aforementioned. Further, the intermediate discs 72 converge radially outwardly to enclose the rotor assembly 50 therebetween and extend into the manifold housing 30 so as to position the turbine blades 68 radially outwardly of the rotor assembly 50.

As more clearly seen in FIG. 2, the longer compressor vanes 56 of rotor assembly 50, are provided with fuel passages 80 extending to fuel burners 82 through which the fuel is burned and combustion products discharge into the discharge passages 64. The fuel passages 80 extend from the fuel burners 82 through the vanes 56 and the hub disc 52 to ports terminating at the axially inner end of a fuel passage 84 formed in the power shaft 20 as shown in FIG. 3. The fuel passage 80 communicates through the fitting 26 with the fuel line 24.

It will be apparent from the foregoing description of the gas turbine engine, that once the fuel is ignited and combustion products are discharged from the fuel burners 82, a reaction thrust is produced causing rotation of the rotor assembly 50 in a clock-wise direction as viewed in FIG. 2. The fluid thus discharged from the discharge passages 64 impinges on the turbine blades 68 producing rotation of the associated rotor assembly 48 in an opposite or counterclock-wise direction. The rotors 48 and 50 thus rotate in opposite directions to effect two stage compression of the air. The compressor vanes 74 associated with the rotor 48 initially compress the air drawn radially inwardly on either axial side of the exhaust manifold housing 30. The initially compressed air passes through the outlet openings 78 and into the inlet openings 66 for second stage compression by the vanes 54 and 56 associated with the rotor 50. While undergoing second stage compression, the air is heated by the combustion products and furthermore accelerated thereby. Thus, a fluid mixture emerges from the discharge passages 64 with increased kinetic energy and thermal energy which is substantially absorbed by the turbine blades 68 for powering the first stage compressor blades 74. Of course, a major portion of the energy released by the burner is in the form of reaction thrust producing rotation of the rotor 50 and the power delivery shaft 20 connected thereto. Further, it will be apparent that only the rotor 50 is mechanically loaded so that any increase in load causing a decrease in its speed will produce an increase in speed of rotor 48. This occurs because the thrust of the gas discharged peripherally from rotor 50 increases with any decrease in speed to increase the kinetic energy imparted to rotor 48 through turbine blades 68. The increased speed of rotor 48 thereby increases the inflow rate of air drawn in by its first stage compressor blades 74 to more completely support fuel combustion that may be increased to meet the increased load on the power shaft.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A gas turbine engine comprising a frame, a pair of counter-rotating rotors rotatably mounted by the frame, one of said rotors being free-running, radial compressor means mounted by said rotors for two stage compression of an intake fluid, turbine blade means mounted by said one of the rotors for receiving the intake fluid discharged from the compressor means and combustion means mounted by the other of the rotors for heating the intake fluid during compression, said one of the rotors including an intake section through which the compressor means draws the intake fluid radially inward and a radially outer section mounting the turbine blade means in enclosing relation to the other of the rotors.

2. The combination of claim 1 wherein the other of the rotors includes a power delivery member on which said one of the rotors is rotationally supported, and a pair of end walls having inlet openings and projecting radially outward into the radially outer section of said one of the rotors.

3. The combination of claim 2 wherein said compressor means includes first stage compressor vanes mounted by the intake section of said one of the rotors, second stage compressor vanes mounted by the other of the rotors radially inwardly of the turbine blade means, and extensions on some of said second stage compressor vanes forming discharge passages for the intake fluid.

4. The combination of claim 3 wherein the combustion means includes thrust producing fuel burners mounted by the other of the rotors from which jets of combustion products are discharged into the intake fluid conducted by said discharge passages.

5. The combination of claim 1 wherein said compressor means includes first stage compressor vanes mounted by the intake section of said one of the rotors, second stage compressor vanes mounted by the other of the rotors radially inwardly of the turbine blade means, and extensions on some of said second stage compressor vanes forming discharge passages for the intake fluid.

6. The combination of claim 5 wherein the combustion means includes thrust producing fuel burners mounted by the other of the rotors from which jets of combustion products are discharged into the intake fluid conducted by said discharge passages.

* * * * *